United States Patent Office 2,864,011
Patented Dec. 9, 1958

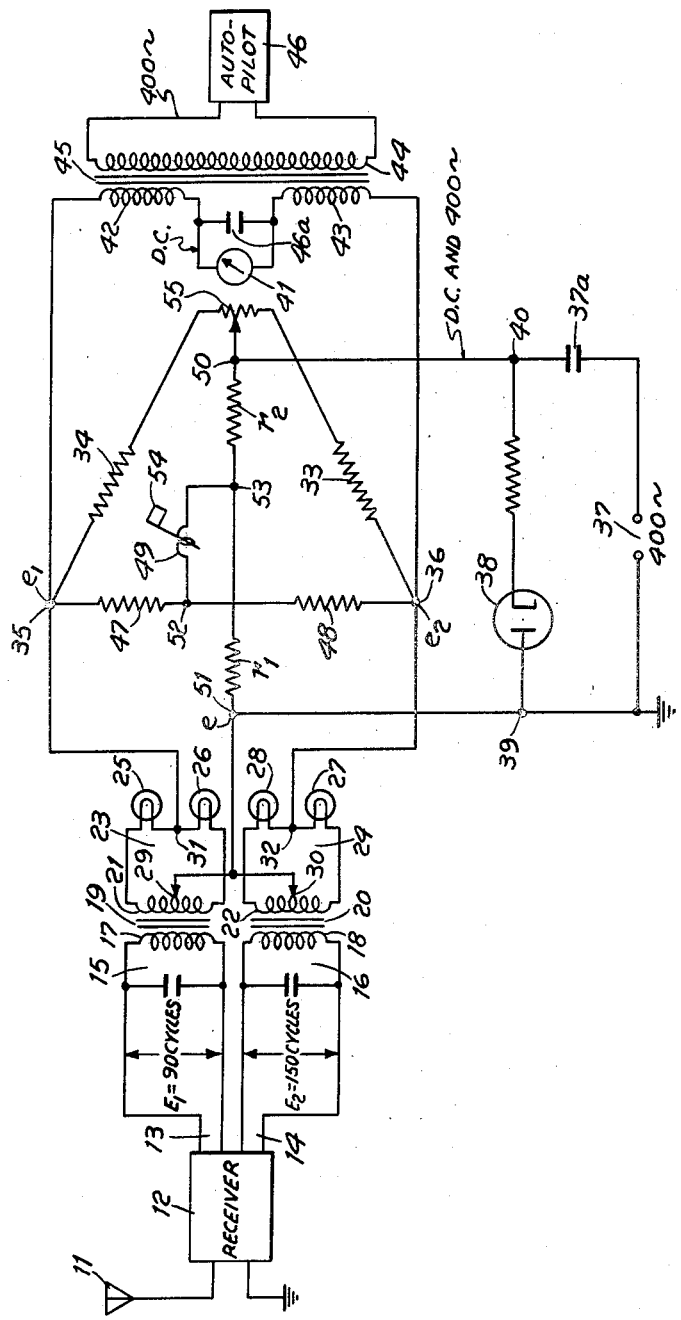

2,864,011

AIRCRAFT NAVIGATION RECEIVER CIRCUITS

Robert T. Adams, Short Hills, N. J., assignor to International Telephone and Telegraph Corporation, Nutley, N. J., a corporation of Maryland Application October 14, 1957, Serial No. 690,054

12 Claims. (Cl. 307—149)

This invention relates to aircraft navigation receiver circuitry and more particularly to the utilization of thermal elements in the flight deviation indicating circuits of aircraft navigational receivers and the control circuits of automatic pilots. This application is a continuation in part of my application No. 396,275, entitled "Aircraft Navigation Receiver Circuits," filed December 4, 1953, now abandoned.

In typical aircraft navigation receivers known to the prior art, varistors or rectifiers have been used in the circuits which actuate the flight deviation indicator meter, the flag alarm circuit and the control circuits of the automatic pilot. In some navigational systems presently in use there are transmitted from a transmitting station two signals which are modulated with audio frequency signals of 90 and 150 cycles per second. Each of these signals is directionally transmitted to a separate quadrant on either side of a desired landing approach path and their transmission patterns are so arranged that the signals overlap in the area forming the preferred landing approach flight path. This means that an aircraft which is on the desired landing path will be receiving a signal which is modulated by both a 90 cycle and a 150 cycle audio frequency. When the aircraft receives these signals and their magnitudes are equal the aircraft is centered on the preferred landing approach path. In this type of navigational system the aircraft receiver detects these two audio signals (90 and 150 cycle per second) in the output of the audio circuitry and couples these audio frequencies to the indicating circuits of the receiver where they are compared for equality. In other navigational systems, such as the omni-directional radio range, two 30 cycle signals are transmitted and at the aircraft receiver are compared in phase, one being a reference signal and the other being a variable phase signal. This arrangement operates with one 30 cycle signal being transmitted according to a cardiod transmission pattern and being rotated through 360° by, for instance, a rotating transmission antenna. When the point of maximum signal output of the cardiod pattern is, for instance, zero degrees or north, a reference frequency modulated omnidirectional signal is transmitted in phase so that an aircraft receiving the two 30 cycle signals might compare their phase and get an indication of his position relative to north.

In the many variations of these navigational radio aid systems, of which the two described above are examples, the two signals, heretofore have been impressed on rectifiers, the D. C. outputs of which were connected substantially in opposition to the coils of a flight deviation indicator meter (FDI). Equality of magnitude of the 90/150 cycle signals or quadrature phase of the 30 cycle signals results in no deflection of the FDI meter. This result assumes that the rectifiers, i. e., varistors and their associated circuits have identical characteristics. It is true that an adjustment is provided in the receiver to compensate for small static inequalities, but it is well known that rectifiers are subject to random variations over the wide range of temperature which may be encountered in the operation of the navigational radio aid circuitry in an aircraft. Thus, the varistors have left much to be desired in respect to stability of characteristics over this wide range of temperature. Much effort has been spent in striving to improve the performance of aircraft navigation receivers, especially in those parts of the circuits where the performance is critical and where the circuitry requires that two or more elements maintain their relative transformation of energy characteristics substantially constant, over long periods of time, when operating over a large range of temperatures above specified ambient conditions.

The present navigation instruments, such as the flight deviation indicator, use direct current (D. C.) meter movements and therefore are well suited for use with circuits having rectifier elements. However, when it is desired to apply the flight deviation indicator information to an autopilot, it is essential to furnish such information at the receiver output to alternating current (A. C.) circuits, and more particularly to 400 cycle circuits. If varistors or rectifiers are used in the bridge circuits as in the prior art, then additional conversion circuitry must be added between the receiver and the autopilot.

In other arrangements in connection with radio aids to aircraft navigation there have been provided bridge circuits used as follow up circuits to return the mechanisms controlling the flight path of an aircraft to their original positions. Some of these arrangements have used sub-bridge circuitry in the arms of a major bridge circuit in order to acquire a high degree of sensitivity. In circuit arrangements using sub-bridge circuits there have been included thermal resistive elements in the sub-bridge circuitry. These sub-bridge circuits are made up of four thermal resistor elements, each matched one to the other. These last-mentioned circuits further use an exciting voltage to be applied thereto and in accordance with the resistance change resulting from a change in temperature of the thermal elements there is a voltage unbalance provided by the major bridge circuit. To make optimum use of this principle such circuit arrangements have provided circuitry means coupling the two input signals to be compared to the two sub-bridge circuits to independently affect the resistance characteristics of the thermal elements through heating with the power applied from the input signals. While the sub-bridge thermal element circuitry does provide an increase in sensitivity, the sensitivity decreases as the exciting voltage is increased to a point where the heating of the thermal elements is more attributable to the exciting voltage than to the signal to be compared.

This condition can be appreciated by examining the graphs on page 92, volume 11, of the MIT Radiation Lab. Series, published by McGraw-Hill, 1947. The graphs show that the resistance of the thermistors eventually become constant with an increase in temperature. If the exciting voltage has been increased to increase sensitivity, following a straightforward concept of the ratio of power output change to input power change there can result an increase in temperature to a point where the resistance of the thermistors become constant. The four thermal element sub-bridge circuit has another undesirable aspect in that there is requisite a match of the four thermal elements to make up the bridge.

It becomes apparent that an indicating control system for use wtih aircraft navigational receiver circuitry which is made up of components relatively free of distorted operation due to wide ranges of operating temperatures, which has a higher degree of sensitivity than the customary thermal element systems, which provides both D. C. and A. C. power so as to indicate a flight path and which provides a fail-safe warning system when using both the above-mentioned D. C. and A. C. sources of power, is highly desirable.

It is therefore an object of the present invention to provide an improved aircraft navigational receiver system.

Another object of this invention is to provide an aircraft navigation receiver bridge circuit which will maintain its transfer of energy characteristics substantially constant, over long periods of time, when operating over a large range of temperatures above specified ambient conditions.

Another object of this invention is to provide an aircraft navigational comparison circuit which is capable of furnishing information at the receiver output to either D. C. or A. C. circuits.

Another object of the present invention is to provide a bridge circuit using sub-bridge circuitry means having thermal elements which has greater sensitivity than the customary thermal element bridge systems.

A still further object of the present invention is to provide a fail-safe warning device to be operative in the event there is a failure of any of the bridge elements as well as either the D. C. or A. C. power supply.

In accordance with a main feature of the present invention there is provided a major bridge circuit having two arms which are sub-bridge circuits each of which uses only two thermal elements in their respective sub-bridge circuits.

In accordance with another main feature of the present invention there is provided an A. C. power input source across which there is coupled a current rectifier means to provide at their common points an exciting voltage having D. C. and A. C. components.

In accordance with another feature of the present invention there is provided at the bridge circuit output means a D. C. sensitive indicator to sense a difference of D. C. polarity and thus indicate the relative amplitudes of the input signals; and an A. C. power phase responsible mechanism to be operated in accordance with the phase of the A. C. component of the exciting voltage.

In accordance with still another feature of the present invention there is provided a warning device which warns the operator of a failure of operation of any of the bridge circuits as well as a failure of the D. C. or A. C. power supply.

The foregoing and other objects and features of this invention and the manner of attaining them will become more apparent and the invention itself will be best understood by reference to the following description of an embodiment of the invention taken in conjunction with the accompanying drawing comprising a sole figure, which is a schematic and block diagram showing the system.

Referring in particular to the figure, there is received at the antenna 11 a signal which is modulated in accordance with the navigational radio aid systems described above, by either a 90 and 150 cycle audio frequency, or a pair of 30 cycle audio frequency signals having a phase relationship which is indicative of some flight path information. Let us assume for purposes of this discussion that the signal received at 11 is a signal which is modulated by a 90 cycle and a 150 cycle audio frequency, the relative magnitudes of which will give information indicative of the aircraft's flight path. The information signal having been received at 11 is passed to the receiver device 12. The receiver device 12 can be any well-known radio signal receiver which is capable of receiving a radio frequency signal and detecting an audio modulation thereof. The audio signals of 90 cycles and 150 cycles are detected at 12 and passed to the input circuits 13 and 14. The filter circuits 15 and 16 are responsive respectively to one of the two audio frequencies. For purposes of further discussion let us assume that the filter circuit 15 is tuned to receive the 90 cycle audio frequency and the filter circuit 16 is tuned to receive the 150 cycle audio frequency. These signals being respectively impressed across the primary windings 17 and 18 of the transformers 19 and 20 will respectively induce current flow in the secondary windings 21 and 22. There are two sub-bridge circuits shown, 23 and 24. The sub-bridge circuit 23 is made up of four arms which are one half the secondary winding 21, a thermal element 25, a thermal element 26 and the other half of the secondary winding 21. In a like fashion the sub-bridge circuit 24 is made up of one half of the secondary winding 22, a thermal element 27, a thermal element 28 and the other half of the secondary winding 22. The thermal elements 25 and 26 are matched as are the thermal elements 27 and 28.

By using two thermal elements in the sub-bridge circuit instead of four, there are certain advantages to be gained. For instance, there is a reduction, by a factor of 2, in the number of matched thermal elements required. There is a reduction, by a factor 2, in failures due to failure of thermal elements. There is increased sensitivity, by nearly a factor of 2, since the available signal input power is concentrated in half the number of elements, giving high temperature rise. It is characteristic of thermal sensitive resistor elements (such as tungsten or carbon lamps, semiconductors, platinum film bolometers, etc.), that the sensitivity in a thermal bridge (i. e., power output change/input power change) is increased by reducing the physical size of the hot element, by improving the insulation surrounding said element (as in vacuum bolometers and thermocouples) or minimizing heat losses in any manner, so that a given change in power level will produce the largest possible change in temperature. Another advantage is apparent when there is some type of warning device circuit used. As compared with a full sub-bridge of four thermal elements, the simplified transformer bridges used as sub-bridges in the figure will exhibit a larger unbalance upon failure of any one thermal element, thereby, providing a more positive alarm indication. The outputs of these respective sub-bridge circuits 23 and 24 are at the respective center tap points 29 and 30 and the junction points 31 and 32. Since the sub-bridge circuits are balanced circuits, the current induced in each of the secondarys 21 and 22 will flow around each of the sub-bridge circuits and will not affect the current flow in the major bridge circuit and will not be affected by the major bridge circuit current flow according to the well-known principle of bridge circuit operation. Depending upon the relative amplitude of the 90 cycle and 150 cycle signals, the power applied to the thermal elements 25, 26, 27 and 28 will differ. Assuming as in the present embodiment that the thermal elements 25, 26, 27 and 28 are of the thermistor variety having a negative temperature coefficient, let us further assume that at a given moment the 90 cycle signal has a larger amplitude than the 150 cycle signal. In accordance with our example there will be more power applied to the thermistor 25 and 26 which will in turn cause these thermistors to be heated more and cause their resistance characteristics to decrease. In the system there is a major bridge circuit which is composed of four arms as follows: the sub-bridge 23, the sub-bridge 24, the resistance element 33, and the resistance element 34. The output of this major bridge circuit is taken from the junction points 35 and 36 and the input to this major bridge circuit is applied to the junction points 37 and 38. This system is to be used with a radio navigational receiver which will give an indication of the aircraft's flight path as well as control an autopilot. There is supplied to the input of the major bridge circuit an exciting voltage which has a D. C. and an A. C. component. This exciting voltage is produced by supplying a 400 cycle A. C. at 37 and a series connected condenser 37a across which there is coupled a rectifier 38. From the common points of this parallel connection 39 and 40 there is supplied an exciting voltage which has D. C. and A. C. components. Returning now to our example we find that the change in resistance because of the relative difference in the amplitudes of our 90 cycle and 150 cycle signals will produce an unbalanced condition between the points 35 and 36. With a difference in potential being produced between the points 35 and 36, the D. C. signal will pass to the D. C. meter 41 which will respond to and indicate both the polarity of the potential difference and the relative magnitudes of input signals. The A. C. signals being impressed in opposition across the primary windings 42 and 43 will produce a signal thereat which is either in phase or 180 degrees out of phase with the A. C. exciting voltage. This A. C. signal phase condition is sensed in the output signal which is induced in the secondary winding 44 of the transformer 45. The phase condition and the magnitude of the A. C. signal output is indicative of the difference between the magnitudes of the input signals and is used by an A. C. phase responsive mechanism, for example, in an autopilot 46, to correct the flight path of the aircraft. The condenser 46a shorts out the A. C. signal from being applied to the D. C. meter 41. If the thermal elements 25, 26, 27 and 28 are of the negative coefficient variety as used in our present example, the voltage drop across the sub-bride arms will be relatively small when compared with the voltage drop across the resistance elements 33 and 34. This condition being true, there will be some current flow through the high impedances of 47 and 48 through the flag energization coil 49 to the input point 50 (assuming for the moment a positive potential at 50 and a negative potential at 51).

By proper choice of resistor values the point 52 can be made to have negative voltage with respect to the point 53. The voltage at 52 is equal to $$\left(\frac{e_1+e_2}{2}\right)$$

while the voltage at 53 is equal to $$\left(\frac{r_1}{r_1+r_2}\right)e$$

where $e_1$ is the voltage value at 35, $e_2$ is the voltage value at 36 and $e$ is the voltage value at 51. When one of the thermal elements opens, for instance, if 25 were to open, the value of $e_1$ would become high and $$\left(\frac{e_1+e_2}{2}\right)$$

at 52 would become greater than the value of $$\left(\frac{r_1}{r_1+r_2}\right)e$$

at 53. During the time that point 52 is held negative with respect to point 53 the coil 49 is energized to hold the flag 54 in a predetermined position. When the potential at 52 becomes positive, with respect to the potential at 53, the flag 54 is dropped out. In a similar manner if the D. C. voltage supply were to fail, the flag coil potential would become reversed to drop the flag and indicate the failure. If the A. C. voltage supply were to fail this would result in a D. C. voltage supply failure since the latter is derived from the former and hence the warning flag would indicate such a failure. The adjusting potentiometer 55 is used to balance the bridge when there are no input signals present.

The thermal elements 25, 26, 27 and 28 may also be of the positive thermal coefficient of resistance variety. In such case the warning flag will not operate in the event of their failure but will operate in the event of a D. C. or A. C. power failure.

If the system is used with the arrangement described above wherein two 30 cycle signals are transmitted, $E_1$ which is shown as 90 cycles in the figure would instead represent the summation of the two 30 cycle input signals, and $E_2$ shown as 150 cycles in the figure would represent the difference of the two 30 cycle signals applied. Inasmuch as the 30 cycle signals have the same amplitude their phase difference is detected by taking a summation of the two 30 cycle and the difference of the two 30 cycle signals. If the 30 cycle signals were in quadrature their summation signal and their difference signal will have the same amplitude and therefore in accordance with the system described above equality would be indicated. If, however, the 30 cycle signals are out of quadrature their summation and difference signals will have different magnitudes and will indicate something different than equality as did a difference in magnitude in the 90/150 cycle hypothetical.

While I have described above the principles of my invention in connection with specific apparatus, it is to be clearly understood that this description is made only by way of example and not as a limitation to the scope of my invention as set forth in the objects thereof and in the accompanying claims.

I claim:

1. A power measuring bridge circuit for comparing the magnitudes of a first and a second input signal comprising a bridge circuit having a first and a second arm, a first and second input transformer each having a primary winding and a center tap secondary winding, each of said secondary windings respectively serially coupled in each of said first and second arms, a first and second pair of thermal resistor elements serially connected across an associated secondary winding, one of the terminals of each of said arms being the junction of the corresponding pair of thermal elements and the other terminal thereof being the center tap of the corresponding secondary winding, means to couple the first and second input signals respectively to the primary windings of said first and second input transformers, a third and fourth arm each including at least a resistance element, a source of exciting voltage, means coupling said exciting voltage source between the junction of said first and second arms and the junction of said third and fourth arms to apply an exciting voltage across said bridge circuit, and means for obtaining an output signal voltage coupled between the junction of said first and third arms and the junction of said second fourth arms.

2. A power measuring bridge according to claim 1, wherein each of said thermal elements has a character of resistance which increases as its temperature increases.

3. A power measuring bridge in accordance with claim 2, in which said thermal elements comprise metallic elements which are operated at a high temperature with respect to the ambient temperature.

4. A power measuring bridge circuit in accordance with claim 1, wherein said exciting voltage is a direct voltage and whereby the polarity of the output signal is indicative of which of the input signals is of greater magnitude.

5. A power measuring bridge circuit in accordance with claim 1, wherein said exciting voltage is an alternating current voltage and whereby the phase of the alternating current output is indicative of which of the input signals is of greater magnitude.

6. A power measuring bridge circuit according to claim 1, which further includes a variable resistance potentiometer coupling said third and fourth arms together and means to couple said exciting voltage to said potentiometer whereby said bridge may be balanced in the absence of any input signal.

7. A bridge circuit according to claim 1, which further includes a first and second pair of serially connected resistance elements, said first pair being connected between the junctions of said first and third arms and said second and fourth arms, said second pair being connected between the junction of said first and second arms and said third and fourth arms, a flag alarm circuit coupled to the center points of each of said pairs of serially connected resistance elements to be energized so long as there is an exciting voltage applied to said bridge and to be de-energized giving a warning signal when said exciting voltage terminates.

8. An indicating control circuit for automatically controlling an alternating current phase responsive mechanism by detecting information from first and second input signals comprising a bridge circuit having a first and second arm, a first and second variable impedance means respectively serially coupled in each of said first and second arms, each of said variable impedance means responsive to a change in applied voltage with a change in impedance thereof, means coupling said first and second input signals respectively to said first and second variable impedance means to produce an impedance variation in accordance with the respective magnitudes of said input signals, a third and fourth arm each including at least a resistance element, an exciting voltage source to supply an exciting voltage having alternating current and direct current components, means coupling said exciting voltage source between the junction of said first and second arms and the junction of said third and fourth arms to apply an exciting voltage across said bridge circuit, direct current sensitive indicating means coupled between the junction of said first and third arms and the junction of said second and fourth arms to sense the polarity of a direct current voltage unbalance of said bridge circuit, and alternating current phase responsive means coupled between said last-mentioned junctions to respond to an alternating current phase unbalance across said bridge circuit.

9. An indicating control circuit for automatically controlling an alternating current phase responsive mechanism by detecting information from first and second input signals comprising a bridge circuit having a first and second arm, a first and second input transformer each having a primary winding and a center tap secondary winding respectively serially coupled in each of said first and second arms, a first and second pair of thermal resistance elements serially connected across an associated secondary winding, one of the terminals of each of said arms being the junction of the corresponding pair of thermal elements and the other terminal thereof being the center tap of the corresponding secondary winding, means to couple the first and the second input signals respectively to the primary windings of said first and second input transformers, a third and fourth arm each including at least a resistance element, an alternating current exciting voltage source serially connected with a condenser, a current rectifier means, said rectifier means coupled across said last-mentioned series connection, means coupling the common conections of said last-mentioned series connection and said rectifier means between the junction of said first and second arms and the junction of said third and fourth arms to apply an exciting voltage across said bridge circuit having alternating current and direct current components, direct current sensitive indicating means coupled between the junction of said first and third arms and the junction of said second fourth arms to sense the polarity of a direct current voltage unbalance of said bridge circuit, and alternating current phase responsive means coupled between said last-mentioned junctions to respond to an alternating current phase unbalance across said bridge circuit.

10. An indicating control circuit according to claim 9, further including a first and second pair of serially connected resistance elements, said first pair of resistance elements coupled between the junction of said first and second arms and the junction of said third and fourth arms, said second pair of resistive elements coupled between the junction of said first and third arms and the junction of said second and fourth arms, and a warning device coil coupled between the midpoints of said first and second pairs of serially connected resistance elements to remain energized so long as the exciting voltage is present and to become de-energized to give a warning when said exciting voltage is not present.

11. An indicating control circuit according to claim 10, wherein the thermal elements have negative thermal coefficients of resistance, and said warning device operates to give a warning if any of said thermal elements is open circuited.

12. An indicating control circuit according to claim 9, wherein said direct current sensitive indicating means comprises a direct current meter and wherein said alternating current phase responsive means comprises an output transformer having primary and secondary windings, said primary winding being coupled between the junction of said first and third arms and the junction of said second and fourth arms, said secondary winding being coupled to an alternating current phase responsive mechanism to be operated in accordance with the phase of the signal induced on said secondary.

No references cited.